United States Patent
Lemaire et al.

(10) Patent No.: US 9,011,102 B2
(45) Date of Patent: Apr. 21, 2015

(54) BLADE WITH MINIMIZED VULNERABILITY

(75) Inventors: Sandrine Lemaire, Pourrières (FR);
Robert Leschi, Marseilles (FR); Cédric Lanouette, Montrouge (FR)

(73) Assignee: Airbus Helicopters, Marignane Cedex (FR)

( * ) Notice: Subject to any disclaimer, the term of this patent is extended or adjusted under 35 U.S.C. 154(b) by 556 days.

(21) Appl. No.: 13/231,246

(22) Filed: Sep. 13, 2011

(65) Prior Publication Data
US 2012/0070300 A1 Mar. 22, 2012

(30) Foreign Application Priority Data
Sep. 16, 2010 (FR) ...................... 10 03691

(51) Int. Cl.
*B63H 7/02* (2006.01)
*B64C 11/16* (2006.01)
*B64C 27/46* (2006.01)
*B64C 27/473* (2006.01)

(52) U.S. Cl.
CPC ....... *B64C 27/473* (2013.01); *B64C 2027/4736* (2013.01)

(58) Field of Classification Search
USPC .................. 416/226, 232, 229 R, 233, 39
See application file for complete search history.

(56) References Cited

U.S. PATENT DOCUMENTS

| | | | |
|---|---|---|---|
| 2,648,388 A | 8/1953 | Haines | |
| 3,674,379 A * | 7/1972 | Monti | ............ 416/226 |
| 3,765,124 A | 10/1973 | Ferris | |
| 4,213,739 A * | 7/1980 | Euler et al. | ............ 416/226 |
| 4,316,700 A * | 2/1982 | Schramm | ............ 416/226 |
| 4,935,277 A * | 6/1990 | Le Balc'h | ............ 428/71 |
| 7,523,889 B2 * | 4/2009 | Bourjac et al. | ............ 244/134 D |
| 2008/0107540 A1 * | 5/2008 | Bonnet | ............ 416/229 R |

FOREIGN PATENT DOCUMENTS

| | | |
|---|---|---|
| FR | 2617119 A1 | 12/1988 |
| FR | 2689565 A1 | 10/1993 |
| FR | 2748719 A1 | 11/1997 |
| FR | 2869565 A1 | 4/2004 |

OTHER PUBLICATIONS

Search Report and Written Opinion; Application No. FR1003691 dated Jul. 7, 2011.

* cited by examiner

*Primary Examiner* — Nathaniel Wiehe
*Assistant Examiner* — Michael Sehn
(74) *Attorney, Agent, or Firm* — Brooks Kushman P.C.

(57) ABSTRACT

A blade (1) having a working shell (10) defining an inner space (16). The blade has a leading-edge space (31) and at least one filler means (40, 50) in said inner space (16) and a leading-edge fairing (20) protecting the working shell (10). The fairing (20) extends from a pressure-side part (21) to a suction-side part (22) via a central part (23). The working shell (10) has in the first zone (13): a pressure-side portion (131), a central portion (133), and a suction-side portion (132). The pressure-side portion (131) is secured to the pressure-side part (21). The suction-side portion (132) is secured to the suction-side part (22). The blade (10) includes first damper means (60) with damping material.

19 Claims, 1 Drawing Sheet

BLADE WITH MINIMIZED VULNERABILITY

CROSS REFERENCE TO RELATED APPLICATIONS

This application claims the benefit of FR 10 03691 filed on Sep. 16, 2010, the disclosure of which is incorporated in its entirety by reference herein.

BACKGROUND OF THE INVENTION (1) Field of the Invention

The present invention relates to a blade with reduced vulnerability, i.e. a blade having optimized tolerance to damage. For example, the invention relates to a blade for a rotor, in particular a rotorcraft rotor.

(2) Description of Related Art

Conventionally, a blade comprises a rigid working shell contributing to the structural strength of the blade, the working shell sometimes being referred to as a "skin", or an "outer skin", or indeed a "working skin".

The working shell has a suction-side wall and a pressure-side wall that extend from a leading-edge first zone to a trailing-edge second zone. In a blade made of composite materials, the working shell may have a suction-side wall and a pressure-side wall that are secured to each other, each including at least one layer of fabric made of high-strength fibers united by a matrix. The suction-side wall and the pressure-side wall may be made separately and then connected together, or they may be made together simultaneously, e.g. by winding.

The working shell is hollow, generally so as to enable it to receive both at least one spar serving in particular to take up the centrifugal forces that act on the blade while it is in rotation, and also at least one filler element. Each spar may be made of composite material, e.g. being made using fibers that are united by a matrix.

Furthermore, it is common practice to provide the trailing-edge zone of the working shell with an edge strip in order to reinforce the blade.

Finally, the inner space of the working shell that is not occupied by a spar is filled with at least one lightweight filler element, in particular to avoid the outer shell deforming under the effect of external pressure, which pressure varies in particular as a function of altitude.

Furthermore, the blade may include at least one internal link member connecting together the pressure-side wall and the suction-side wall. The internal link member then extends in the span direction of the blade inside the working shell between the leading-edge zone and the trailing-edge zone of said blade so as to connect together the suction-side wall and the pressure-side wall. Such a link member may be a spar or a rib.

Under such circumstances, depending on the embodiment and by way of example, a blade may include a solid leading-edge spar fitted with a counterweight for centering the blade together with an internal link member, the leading-edge spar extending in the span direction of the blade inside the working shell in the leading-edge zone of said blade.

Furthermore, a first filler element is arranged inside the working shell between the leading-edge spar and the internal link member, and a second filler element is arranged inside the working shell between the internal link member and an edge strip arranged in the trailing-edge zone of said working shell.

Furthermore, it is common practice to cover the outside of the leading-edge zone of the working shell with a protective fairing commonly referred to as a "leading edge" or as a "leading-edge fairing" given its location.

A fairing serves in particular to protect the blade against impacts.

Document FR 2 748 719 describes a blade having a structure of that type.

Furthermore, it should be observed that certain blades include deicing and/or anti-icing devices. Such a deicing device is sometimes provided with deicing means connected to an electrical power network via wired power supply means and wired electrical return means between the fairing and the working shell of the blade.

In the event of an impact with a foreign body, the fairing may suffer residual deformation. Under such circumstances, the working shell is sometimes also deformed and becomes locally separated from the spar and the filler means.

Furthermore, when the leading-edge spar is made of composite material, the matrix of the spar becomes cracked, thereby leading to delamination and consequently to portions of fiber becoming separated from the resin, for example.

A serious impact thus severely damages a rotor blade.

Furthermore, it should be observed that it is difficult to implement the electrical return means of a deicing device, with it being possible for the electrical return means to be damaged by the heat given off by the deicing means when in operation.

The technological background includes document FR 2 617 119.

Document FR 2 617 119 describes a blade of composite material having a structural core, the structural core having a working shell filled in particular by means of a leading-edge spar, a link member of the central spar type, and filler elements.

Furthermore, the blade is provided with a covering skin surrounding the structural core. The covering skin possesses a rigid wall and a layer of non-structural shaping material that surrounds the structural core, said layer being interposed in practice between the structural core and the rigid wall.

Furthermore, document FR 2 689 565 departs from the invention by presenting a composite structure that is provided with a main core covered using a complex surface skin, which skin comprises both an elastomer member and a rigid protective layer.

Documents U.S. Pat. No. 2,648,388, US 2008/107540, and U.S. Pat. No. 3,765,124 are also known.

SUMMARY OF THE INVENTION

An object of the present invention is thus to propose a reduced-vulnerability blade provided with means for limiting damage to the blade following an impact, and optionally for optimizing the incorporation of an electrical device of the deicing device type in the blade where appropriate.

According to the invention, a blade comprises a working shell extending from a leading-edge first zone to a trailing-edge second zone, the working shell defining an inner space, there being a leading-edge spar and at least one filler means arranged in the inner space extending in the span direction of the blade, the leading-edge spar being arranged against the working shell in the leading-edge first zone, the blade being provided with a leading-edge fairing for protecting the working shell in the first zone from impacts.

Furthermore, the fairing extends from a pressure-side part towards a suction-side part via a central part, the working shell comprising in succession in the first zone: a pressure-side portion, a central portion, and a suction-side portion; the pressure-side portion of the shell being secured to the pressure-side part of the fairing, the suction-side portion of the shell being secured to the suction-side part of the fairing, and the blade including first damper means firstly provided with damping material and secondly arranged in an outer space extending between the central part of the fairing and the central portion of the shell.

It should be observed that the adjectives "inner" and "outer" are to be understood relative to the working shell, the inner space being situated inside the working shell and the outer space being situated outside the working shell.

It should be observed that the first damper means are front means that are flattened as a result of an impact of an outside member against the protective fairing. The first damper means then absorb at least some of the energy released by said impact, thereby at least limiting damage to the blade, as compared with a conventional blade.

The blade may include one or more of the following characteristics.

In a first embodiment, the blade includes only the first damper means for combating front impacts.

In a second embodiment, in addition to the first damper means, the blade may include second damper means provided with damping material, the second damper means being arranged in the inner space between the leading-edge spar and front filler means.

Furthermore, the damping material of the first and/or second damper means is advantageously flexible in order to absorb the energy of an impact, or indeed to reveal the presence of an impact by controlled and visible deformation of the fairing. For example, the damping material may form part of the category of neoprene materials, silicone materials, or indeed elastomers.

According to another aspect, the damping material of the first and/or second damper means is meltable at a temperature higher than a first predetermined temperature. This first predetermined temperature may for example be 80° C. The damping material is fastened to the adjacent members of the blade by means of an adhesive, so the first predetermined temperature is advantageously higher than the melting temperature of the adhesive used for fastening the damping material.

Furthermore, the damping material may for example be meltable at a temperature that is lower than a second predetermined temperature, in particular to guarantee that the working shell of the blade does not run the risk of being damaged when replacing the damping material.

Thus, the damping material may for example be meltable at a temperature lying between a first predetermined temperature of about 80° C. and a second predetermined temperature of about 150° C.

In addition, the blade may include electrical connections embedded in the first damper means, wired connections or indeed optical connections, for example.

These electrical connections may be electrical power supplies and/or electrical returns or else data transmission means, these electrical connections being used for example in:
  blade deicing means;
  blade anti-icing means;
  lighting means, such as a flashing light arranged at the tip of the blade;
  an active flap;
  an incorporated maintenance inspection system; and/or
  sensors of all kinds, such as impact, temperature, or pressure sensors, in particular.

The electrical connections are then only lightly stressed mechanically and they are subjected only to small amounts of lengthening.

Furthermore, the use of a flexible material for the first damper means makes it possible to absorb energy in the event of an impact and to reveal the presence of an impact without breaking the electrical connections running along the span of the blade.

In addition, when the first damper means are meltable at a temperature lying between a first predetermined temperature and a second predetermined temperature, it is possible to gain access to the electrical connections passing therethrough in order to repair them, e.g. in the event of the electrical power supply system overheating.

Thus, in order to unstick the fairing from the first damping material, it suffices to heat the blade to a temperature that is higher than or equal to the first predetermined temperature.

In addition, by heating the blade to a temperature lying between a first predetermined temperature and a second predetermined temperature, it is possible to gain access to the electrical connections included in the first damper means.

Furthermore, the blade may include a link member connecting together the pressure-side wall and the suction-side wall of the working shell, which link member may for example be arranged in the inner space between front filler means adjacent to the leading-edge spar and rear filler means. The link member may then be either a spar or a rib.

It should be observed that depending on the embodiment, the front filler means are adjacent to the leading-edge spar, being directly adjacent to said leading-edge spar, and/or being separated from the leading-edge spar by second damper means. Thus, three possibilities can then be envisaged, with the front filler means being adjacent to the leading-edge spar when:
  in the first embodiment, the front filler means are directly adjacent to the leading-edge spar;
  in a first variant of the second embodiment, the front filler means are completely separated from the leading-edge spar by second damper means; or
  in a second variant of the second embodiment, the front filler means are separated in part from the leading-edge spar by second damper means.

Finally, the blade may optionally include an edge strip.

BRIEF DESCRIPTION OF THE DRAWINGS

The invention and its advantages appear in greater detail from the following description of embodiments given by way of illustration with reference to the accompanying figures, in which.

DETAILED DESCRIPTION OF THE PREFERRED EMBODIMENTS

Elements that are present in more than one of the figures are given the same references in each of them.

Figure 1:
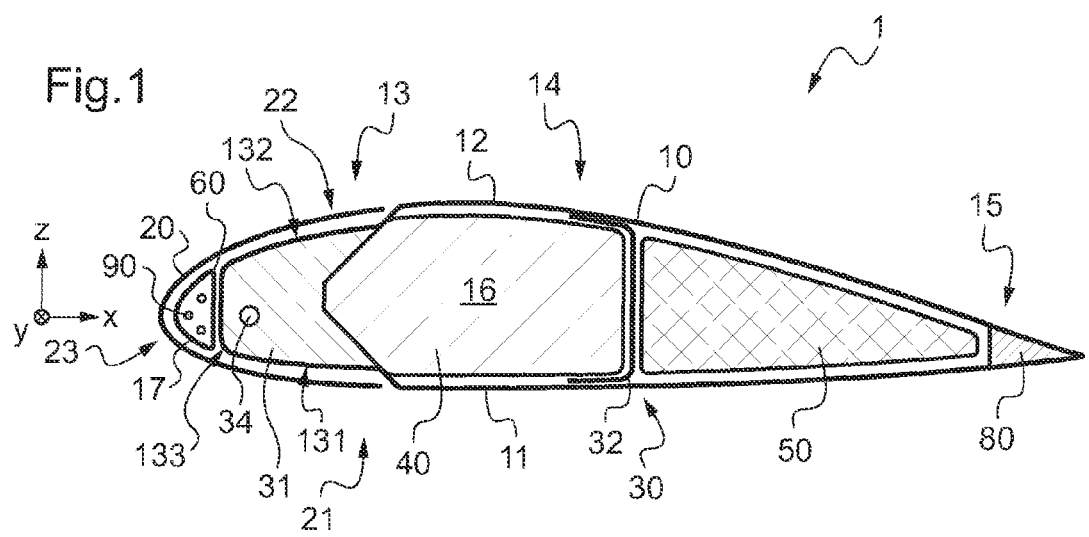
FIG. 1 is a section of a blade in a first embodiment.
Figure 2:
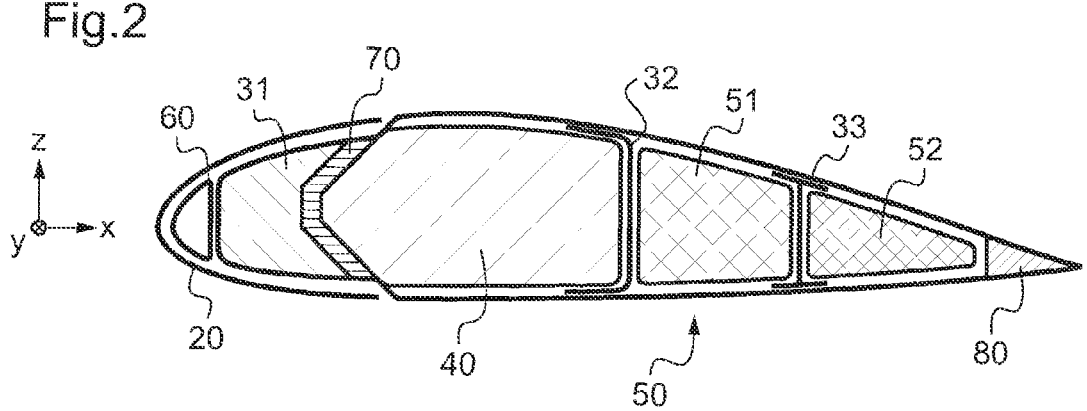
FIG. 2 is a section of a blade in a second embodiment.

It should be observed that three mutually orthogonal directions X, Y, and Z are shown in FIGS. 1 and 2.

The direction X is said to be "longitudinal", the chord of each profile of the blade shown extending along this longitudinal direction X.

Another direction Y is said to be "transverse". The span of the blades shown extends along this transverse direction Y.

Finally, a third direction Z is said to be in "elevation" and corresponds to the thickness dimensions of the blades shown.

FIG. 1 is a section of a blade 1 in a first embodiment.

Independently of the embodiment, the blade 1 comprises a working shell 10 that has its span extending along the transverse direction Y, its chord along the longitudinal direction X, and its thickness along the elevation direction Z. More precisely, the chord of the working shell 10 extends from a leading-edge first zone to a trailing-edge second zone 15 by passing via a central third zone 14. The working shell 10 then has a pressure-side wall 11 and a suction-side wall 12 extending along its chord from a leading-edge first zone to a trailing-edge second zone 15 by passing via a central third zone 14, the walls being united firstly at the first zone 13 and secondly at the second zone 15.

Thus, the working shell 10 defines an inner space 16 between the pressure-side wall 11 and the suction-side wall 12.

The blade 1 also possesses at least one spar 30 and in particular a leading-edge spar 31.

The leading-edge spar 31 is arranged inside the inner space 16 in the first zone 13 of the working shell 10. This leading-edge spar 31 is secured to the pressure-side wall 11 and to the suction-side wall 12, and it extends along the span of the blade 1. It should be observed that the leading-edge spar may include a counterweight 34.

Furthermore, the blade 1 shown possesses an edge strip 80 inside the inner space 16 between the pressure-side wall 11 and the suction-side wall 12 in the trailing-edge second zone 15 of the working shell 10.

Under such circumstances, the blade 1 includes at least one filler means 40, 50 for filling the inner space between the leading-edge spar 31 and the edge strip 80.

By way of example, the filler means comprise front filler means 40 and rear filler means 50 that are separated by a link member 32 that serves to connect the pressure-side wall 11 to the suction-side wall 12, i.e. a spar or indeed a rib. The front filler means 40 are situated between the leading-edge spar 31 and the link member 32, and the rear filler means 50 are situated between the link member 32 and the edge strip 80 in the second zone 15.

As shown in FIG. 2, the rear filler 50 may further be split into a plurality of blocks that are separated in the span direction by a link member 33 of the spar or rib type 33.

With reference to FIG. 1, the blade 1 has a protective fairing 20, in particular for protecting the first zone 13 of the working shell 10 from possible impacts.

Reference may be made to the literature to obtain examples of materials suitable for constituting the working shell 10, the spars 31, 32, the filler means 40, 50, and the protective fairing 20.

Independently of the embodiment, first damper means 60 are arranged in part between the fairing 20 and the working shell 10.

The fairing 20 extends from a pressure-side part 21 to a suction-side part 22 via a central part 23, with the working shell 10 comprising in succession in the first zone 13: a pressure-side portion 131 of the pressure-side wall 11, a central portion 133 at the junction between the pressure-side wall 11 and the suction wall side 12, and then a suction-side portion 132 of the suction-side wall 12; with the pressure-side portion 131 being secured to the pressure-side portion 21, and the suction-side portion 132 being secured to said suction-side portion 22. Thus, the blade 10 presents an outer space 17 between the fairing 20 and the working shell, this outer space 17 being filled with first damper means 60 having damping material.

The fairing 20 is then secured directly to the working shell 10 via its pressure-side part 21 and its suction-side part 22, and it is secured indirectly to the working shell 10 in its central part 23 via the first damper means 60.

By way of example, the first damper means 60 are provided with a flexible damping material suitable for absorbing the energy that results from an impact.

This damping material is optionally meltable at a temperature higher than a first predetermined temperature of 80° C., for example, and possibly less than a second predetermined temperature of about 150° C.

Furthermore, the blade 1 may include electrical connections 90 embedded in the first damper means 60. The flexible nature of the first damper means 60 serves to protect the electrical connections 90, and the meltable nature of said first damper means 60 enables the electrical connections 90 to be replaced, if necessary.

In the first embodiment of FIG. 1, the blade 1 has single damper means, namely the first damper means 60 arranged in the outer space 17.

In contrast, in the second embodiment of FIG. 2, in addition to the first damper means 60, the blade 1 includes second damper means 70.

The second damper means 70 are arranged between the leading-edge spar 31 and the front filler means 40.

Going from the leading edge to the trailing edge of the blade 1, the blade 1 then comprises a fairing 20, first damper means 60, the working shell 10, the leading-edge spar 31, the second damper means 70, front filler means 40, a central spar or rib 32, rear filler means 50, an edge strip 80, and then the wall of the working shell 10.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A blade comprising a working shell extending from a leading-edge first zone to a trailing-edge second zone, the working shell defining an inner space, there being a leading-edge spar and a filler material arranged in the inner space extending in the span direction (Y) of the blade, the leading-edge spar being arranged against the working shell in the leading-edge first zone, the blade being provided with a leading-edge fairing protecting the working shell in the first zone, wherein:

said fairing extends from a pressure-side part towards a suction-side part via a central part, the working shell comprising in succession in the first zone: a pressure-side portion, a central portion, and then a suction-side portion; the pressure-side portion of the shell being secured to the pressure-side part of the fairing, the suction-side portion of the shell being secured to the suction-side part of the fairing, the working shell cooperating with the fairing to define an outer space between the central part of the fairing and the central portion of the shell, and the blade including a first damper means firstly provided with damping material and secondly arranged in the outer space; and wherein the blade includes a second damper means provided with damping material, the second damper means being arranged in the inner space between the leading-edge spar and filler material, wherein the damping material of the first damper means and the second damper means comprises an elastomer.

2. A blade according to claim 1, wherein the damping material of the first damper means and second damper means is flexible in order to absorb the energy of an impact.

3. A blade according to claim 1, wherein the damping material of the first damper means and second damper means is fastened by means of an adhesive, and the damping material is meltable at a temperature higher than a first predetermined temperature in order to enable it to be withdrawn, the first predetermined temperature being higher than a melting temperature of the adhesive.

4. A blade according to claim 3, wherein the predetermined temperature is 80° C.

5. A blade according to claim 1, including electrical connections embedded in the first damper means.

6. A blade according to claim 1, wherein the blade includes a link member connecting a pressure-side wall of the working shell to a suction-side wall thereof, the link member being arranged in the inner space between a rear portion of filler material and a front portion of filler material adjacent to the leading-edge spar.

7. A blade according to claim 1, including an edge strip.

8. A blade according to claim 1, wherein the damping material of the first damper means and second damper means has a melting temperature between 80° C. and 150° C.

9. A blade according to claim 1, wherein the damping material of the first damper means and second damper means comprises neoprene or silicone.

10. A rotor blade for a rotorcraft, the rotor blade comprising:
a shell defining an interior space and having an inner surface, an outer surface, a pressure side, a suction side, a chord extending from a leading edge zone to a trailing edge zone, and a span extending orthogonally to the chord;
a leading edge spar arranged within the interior space and extending along the span and connected to the inner surface of the shell proximate the leading edge zone;
a central spar arranged within the interior space and extending along the span and connected to the inner surface of the shell between the leading edge spar and the trailing edge zone;
a leading edge fairing having an inner surface, the fairing being connected to the outer surface of the shell proximate the leading edge zone and extending from the pressure side to the suction side to define a cavity between the outer surface of the shell and the inner surface of the fairing;
a layer of filler material disposed within the interior space of the shell between the central spar and the leading edge spar;
a first layer of damping material disposed in the cavity between the leading edge fairing and the outer surface of the shell; and
a second layer of damping material disposed between the leading edge spar and the layer of filler material, wherein the damping material of the first and second layers of damping material comprises an elastomer.

11. The rotor blade of claim 10, further comprising an electrical connection arranged within the damping material.

12. The rotor blade of claim 11, wherein the electrical connection includes a de-icing element.

13. The rotor blade of claim 10, wherein the damping material has a melting point between 80° C. and 150° C.

14. The rotor blade of claim 10, wherein the damping material comprises neoprene or silicone.

15. A rotor blade comprising:
a leading edge spar extending in a span-wise direction;
a central spar extending in a span-wise direction and spaced from the leading edge spar;
a shell defining an interior space and having an inner surface, an outer surface, a pressure side, a suction side, a leading edge, and a trailing edge, the leading edge spar being retained within the interior space proximate the leading edge and connected to the pressure side and suction side on the inner surface of the shell, the central spar being retained within the interior space between the leading edge spar and the trailing edge and connected to the pressure side and suction side on the inner surface of the shell;
a first layer of filler material disposed in at least a portion of the interior space of the shell between the leading edge spar and the central spar;
a second layer of filler material disposed in at least a portion of the interior space of the shell between the central spar and the trailing edge;
a fairing having an inner surface and extending from the outer surface of the shell proximate the leading edge, the fairing being connected to the pressure side and suction side of the outer surface of the shell and defining a cavity between the inner surface of the fairing and the outer surface of the shell;
a first layer of damping material disposed in at least a portion of the cavity between the inner surface of the fairing and the outer surface of the shell; and
a second layer of damping material disposed between the leading edge spar and the first layer of filler material, wherein the damping material of the first and second layers of damping material comprises an elastomer.

16. The rotor blade of claim 15, further comprising an electrical connection arranged within the first layer of damping material.

17. The rotor blade of claim 16, wherein the electrical connection includes a de-icing element.

18. The rotor blade of claim 15, wherein the damping material of the first and second layers of damping material has a melting point between 80° C. and 150° C.

19. The rotor blade of claim 15, wherein the damping material of the first and second layers of damping material comprises neoprene or silicone.

* * * * *